United States Patent [19]

Roll

[11] Patent Number: 5,575,559
[45] Date of Patent: Nov. 19, 1996

[54] MIXER FOR MIXING MULTI-PHASE FLUIDS

[75] Inventor: Daniel R. Roll, Seneca Falls, N.Y.

[73] Assignee: Goulds Pumps, Inc., Seneca Falls, N.Y.

[21] Appl. No.: 551,572

[22] Filed: Nov. 1, 1995

Related U.S. Application Data

[63] Continuation of Ser. No. 308,701, Sep. 19, 1994, abandoned.

[51] Int. Cl.⁶ .................................. B01F 5/04; B01F 7/32
[52] U.S. Cl. .................. 366/171.1; 366/307; 366/325.94
[58] Field of Search ............................... 366/64, 65, 168, 366/171, 172, 262–265, 307, 325, 171.1, 172.1, 172.2, 173.1, 174.1, 181.4, 181.5, 325.94; 162/57, 243

[56] References Cited

U.S. PATENT DOCUMENTS

| | | |
|---|---|---|
| 271,242 | 1/1883 | Hobbs . |
| 612,317 | 10/1898 | Dundon . |
| 922,076 | 5/1909 | Beemer . |
| 1,745,727 | 2/1930 | Sterzl . |
| 2,185,955 | 1/1940 | Schibbye . |
| 2,190,896 | 2/1940 | Underwood . |
| 2,225,095 | 12/1940 | Beverly . |
| 2,230,647 | 2/1941 | Knight . |
| 2,260,198 | 10/1941 | Smith . |
| 2,311,813 | 2/1943 | Beck et al. . |
| 2,465,056 | 3/1949 | Bond . |
| 2,682,205 | 6/1954 | Vincent . |
| 2,768,751 | 10/1956 | Booth . |
| 2,833,484 | 5/1958 | Gooding, Jr. . |
| 2,838,981 | 6/1958 | Dent . |
| 2,908,390 | 10/1959 | Rich et al. . |
| 2,937,857 | 5/1960 | Thurman . |
| 2,969,960 | 1/1961 | Gurley, Jr. . |
| 2,970,817 | 2/1961 | Gurley, Jr. . |
| 3,029,951 | 4/1962 | Cannon . |
| 3,164,513 | 1/1965 | Calehuff . |
| 3,229,965 | 1/1966 | Hill ..................................... 366/307 X |
| 3,276,584 | 10/1966 | Mathewson . |
| 3,284,055 | 11/1966 | Johansen . |
| 3,307,919 | 3/1967 | McCleary et al. . |
| 3,319,937 | 5/1967 | Wilson et al. . |
| 3,321,283 | 5/1967 | Ewald . |
| 3,363,759 | 1/1968 | Clarke-Pounder . |
| 3,380,669 | 4/1968 | Hatton . |
| 3,400,820 | 9/1968 | Nelson . |
| 3,409,132 | 11/1968 | Meadows . |
| 3,411,721 | 11/1968 | Delcellier . |
| 3,471,131 | 10/1969 | Fritzweiler et al. . |
| 3,476,641 | 11/1969 | Milewski . |
| 3,477,571 | 11/1969 | Maag . |
| 3,499,528 | 3/1970 | Salomon . |
| 3,532,151 | 10/1970 | Hachiya . |
| 3,559,957 | 2/1971 | Hurter ................................... 261/84 X |
| 3,561,605 | 2/1971 | Likness . |
| 3,584,685 | 6/1971 | Boyd . |

(List continued on next page.)

FOREIGN PATENT DOCUMENTS

| | | |
|---|---|---|
| 1102604 | 6/1981 | Canada . |
| 2423528 | 10/1975 | Germany . |
| 75134346 | 11/1975 | Sweden . |
| 1446551 | 8/1976 | United Kingdom . |

OTHER PUBLICATIONS

"Ahlmix Medium Consistency Mixer; Color brochure; 8 pages; ©1991".
"Ahlmix Brochure; 8 pages; Jun. 1989".
"Ahlmix–Mixers–Technical Data; 32 pages; Aug. 1988".

Primary Examiner—Charles E. Cooley
Attorney, Agent, or Firm—Leydig, Voit & Mayer, Ltd

[57] ABSTRACT

A mixer for mixing multi-phase fluids with various substances. The mixer includes a rotor with a plurality of blades extending within a chamber through which the multi-phase fluids and substances continuously flow while being mixed. The chamber of the mixer includes a single rib for generating turbulence and may be eccentrically located with respect to the axis of rotation of the rotor. In addition, the rotor blades and the rib may be separately angled with respect to the axis of rotation of the rotor.

28 Claims, 4 Drawing Sheets

U.S. PATENT DOCUMENTS

| | | |
|---|---|---|
| 3,589,977 | 6/1971 | Fournet . |
| 3,617,008 | 11/1971 | Lamort . |
| 3,680,696 | 8/1972 | Morin . |
| 3,694,312 | 9/1972 | Sköldkvist . |
| 3,849,302 | 11/1974 | Seifert . |
| 3,877,648 | 4/1975 | Vokes . |
| 3,887,429 | 6/1975 | Schmid et al. ............ 162/261 |
| 3,897,013 | 7/1975 | Love . |
| 4,002,559 | 1/1977 | Paterson et al. . |
| 4,003,105 | 1/1977 | Guschin et al. . |
| 4,041,560 | 8/1977 | Jacobsen . |
| 4,078,026 | 3/1978 | Fallenius . |
| 4,093,506 | 6/1978 | Richter . |
| 4,105,543 | 8/1978 | Seifert . |
| 4,111,373 | 9/1978 | Holz . |
| 4,155,841 | 5/1979 | Chupka et al. . |
| 4,166,028 | 8/1979 | Weber . |
| 4,174,907 | 11/1979 | Suh et al. . |
| 4,231,666 | 11/1980 | Baron . |
| 4,276,159 | 6/1981 | Lehman . |
| 4,339,206 | 7/1982 | Ahs . |
| 4,383,918 | 5/1983 | Chupka et al. . |
| 4,577,974 | 3/1986 | Prough et al. ............ 366/307 |
| 4,814,042 | 3/1989 | MacLeod et al. . |
| 4,820,381 | 4/1989 | Brown ................ 162/57 X |
| 4,834,547 | 5/1989 | Niskanen ............ 366/176 X |
| 4,877,368 | 10/1989 | Timperi et al. ........ 366/156 X |
| 5,112,444 | 5/1992 | Henricson et al. . |
| 5,147,504 | 9/1992 | Henricson et al. . |
| 5,172,813 | 12/1992 | Ljokkoi . |
| 5,209,641 | 5/1993 | Hoglund et al. ........... 416/223 B |
| 5,263,774 | 11/1993 | Delcourt ............ 162/243 X |
| 5,279,709 | 1/1994 | Niskanen ............ 162/57 X |

FIG. 8

MIXER FOR MIXING MULTI-PHASE FLUIDS

This is a continuation of application Ser. No. 08/308,701 filed on Sep. 19, 1994 now abandoned.

FIELD OF THE INVENTION

The present invention relates to mixers for mixing multi-phase fluids with various substances and, more particularly, to such mixers which include a rotor with a plurality of blades extending within a chamber through which the multi-phase fluids and substances continuously flow while being mixed.

BACKGROUND OF THE INVENTION

Mixers may be used in a broad range of applications involving the mixing of fluids with other substances. For example, in the chemical processing industry, mixers may be utilized to homogenize and emulsify various multi-phase fluids. In one particular application, mixers are utilized to mix clay kaolin into water for use in making a number of products including paper and ceramics. In another application, mixers may be used to mix oxygen with waste products to facilitate biodegradation. In these processing systems, mixing is executed on a batch-by-batch basis in large retention tanks or towers. Since these methods require that a batch of substances be isolated for a given period of time while being mixed, either large numbers of retention tanks are required or the overall output of the processing plant is limited.

Mixers have also been used in the paper-making industry to mix fibrous pulp slurries with bleaching chemicals such as sodium or calcium hypochlorite, chlorine gas, hydrogen dioxide, etc. Some paper processing plants utilize continuous feed mixers to mix chemicals into fibrous slurries on a continuous basis as the slurries move through the processing system. These previous mixers work with slurries or suspensions having varying consistencies of wood pulp content, ranging from less than 1% to nearly 20% by weight. Some of the continuous feed mixers do not include moving parts but force the fibrous slurry and the mixing chemicals into narrow passageways which include sharp corners causing the direction of flow to change abruptly thereby disrupting the fibrous suspension and chemicals and causing them to mix. These types of mixers have been utilized in most cases to mix chemicals with fibrous slurries having consistencies in the lower range from below 1% to 4% by weight.

At certain points in the paper-making process, or at all points in certain processes, it can be advantageous to maintain the suspension at a high consistency. In such situations, it becomes more difficult to properly mix the chemicals into the fibrous slurry on a continuous basis. This is due to the tendency of the fiber suspension to create flocs or clumps of fibers at higher consistencies which inherently entangle to form networks or structures. To achieve a uniform distribution of chemicals in these situations without lowering the consistency of the fibrous suspension, the fibrous network must be disrupted.

Previous continuous mixers for mixing chemicals with higher consistency fibrous suspensions impart turbulence into the fibrous slurry and chemicals to effect mixing. Examples of these earlier mixers are shown in U.S. Pat. Nos. 3,887,429 and 3,559,957 and Canadian patent 1,102,604. In each of these earlier mixers, a rotor including protrusions along its outer circumference rotates within a chamber having protrusions which extended in an opposed direction. As the rotor rotates, shear forces are generated between the rotor protrusions and the chamber protrusions thereby disrupting the network of the fibrous suspension. In some of these earlier devices, the axis of rotation of the rotor is parallel to the overall flow of fibrous suspension and chemicals through the mixer. In other mixers, the axis of the rotor is perpendicular to the overall flow of the substances through the device. In either case, these earlier mixers focus on imparting turbulence to the slurry in order to disrupt the network and allow the chemicals to become mixed with the fibrous suspension.

While the earlier mixers can successfully mix chemicals into a fibrous slurry on a continuous basis, they have certain drawbacks and deficiencies. One important overall shortcoming of the prior mixers is that they require a substantial amount of energy to maintain an adequate rate of flow for a given degree of mixing. In addition, the earlier mixers create a substantial pressure drop across the mixer as measured at the inlet and outlet. These inefficiencies among others explained below lead to higher costs of manufacture and operation and added complexity of machinery, installation and service.

A specific shortcoming of the prior mixers is that the rotating device, in generating shear forces alone, requires a significant amount of power not contributing to the flow of substances through the mixer or reducing the pressure drop from the inlet to the outlet of the mixer. As a result, the pressure at the inlet of the mixer must be maintained at a higher level for a given outlet pressure. Consequently, a larger, more costly, pump must be utilized upstream of the mixer in order to maintain the higher inlet pressure.

Another related shortcoming of prior mixers arises from the fact that each typically has a chamber with an interior surface which is concentric with the axis of rotation of the rotor. This concentricity does not facilitate flow through the mixer while generating turbulence. More specifically, the prior mixers include protrusions symmetrically placed along the inner surface of the casing such that substantially equal amounts of turbulence are generated against the direction of the overall flow of substances through the mixer as in the direction of flow. Consequently, the flow components generated by the rotor element of the previous mixers essentially cancel each other which results in a higher overall resistance to flow through the mixer. Stated another way, the rotation of the mixer's rotor does nothing to facilitate flow through the mixer.

Another shortcoming of the prior mixers is that the rotating device includes substantial structure located directly in the overall flow path of the suspension through the mixing chamber. More specifically, the prior mixers include rotating elements having solid cylindrical bodies with protrusions on their outer surfaces and shafts extending through the chamber of the mixer. Rather than merely facilitating the mixing of the fibrous suspension with the chemicals, these prior mixers present considerable resistance to the flow of the substances through the mixer.

Yet another shortcoming of the prior mixers is that the protrusions which extend from the continuous outer surface of the rotating element only generate turbulence with the protrusions on the inner surface of the casing. The earlier mixers thus do not advantageously utilize any interaction between the protrusions of the rotating device. Consequently, the overall turbulence generated by the mixer is limited and more power and more structure is required.

Yet another shortcoming of the prior mixers is that the shear forces are generated between protrusions which are parallel to each other and with the axis of rotation of the rotor. Consequently, the entire length of the protrusions of the rotor and the chamber interact with one another at the same time. Thus, the shear forces generated by the interaction of the protrusions are relatively concentrated in time rather than being continuous and varying in nature.

SUMMARY OF THE INVENTION

Accordingly, a general object of the present invention is to provide a continuous flow mixer for mixing multi-phase fluids with substances which includes a multi-bladed rotor for rotation within an eccentric mixing chamber.

Another general object of the present invention is to reduce the pressure drop across the inlet and outlet of a continuous mixer during operation.

Yet another general object of the present invention is to improve the level of mixing achieved by a continuous feed mixer at a given flow rate.

Another object of the present invention is to improve the turbulence generated by a continuous flow mixer at a given speed of rotation.

Yet another general object of the present invention is to improve the energy efficiency of a mixer for multi-phase fluids.

The foregoing and other objects are, in the present invention, embodied in an improved apparatus suitable, for example, for mixing high consistency fiber suspensions on a continuous basis with various other substances such as bleaching chemicals. In the preferred embodiment, the turbulence generating element is constructed with multiple blades which extend within a mixing chamber defined by the inner surface of a casing. Rather than having a solid or closed rotor element with protrusions extending from its outer surface, a mixer incorporating the present invention may include an open rotor with a plurality of individual blades providing surfaces for generating shear forces while not presenting unnecessary resistance to flow of substances through the mixer. A rotational element constructed in accordance with the present invention offers the additional benefit that the individual blades of the rotor are able to interact with one another during operation to generate additional shear forces further facilitating mixing of the substances.

In accordance with one aspect of the present invention, a casing is provided wherein its inner surface defines a chamber which is eccentrically located with respect to the axis of rotation of the rotor. In accordance with this aspect of the invention, the inner surface of the mixing chamber is disposed closer to the blades of the rotor on one side than the other. Such a chamber in accordance with the present invention may have only a single rib for generating turbulence (i.e., disrupting the flow) rather than multiple protrusions located symmetrically around the inner surface of the mixing chamber. The rib may be located in the region with the most clearance between the inner surface of the chamber and the blades of the rotating element.

In accordance with another aspect of the present invention, a rotor including extending blades may be driven so that its blades are moving in substantially the same direction as the overall flow of substances from the inlet of the mixer to the outlet when such blades pass the rib projecting from the inner surface of the chamber. In accordance with the present invention, when the blades of the rotor are moving in the arc of the rotation counter to the overall flow of the substances through the mixer, they are in close proximity to the smooth and continuous inner surface of the eccentric chamber. As such, the turbulence generated by a mixer in accordance with the present invention may be maintained in a manner which offers lower resistance to the flow of the substances through the mixer.

In accordance with yet another aspect of the present invention, a rotor may be provided with multiple blades which are angled or helically disposed with respect to the rotor's axis of rotation. In the preferred embodiment, such blades are angled in the direction of rotation so that the distal portion of each blade leads the remainder of the blade as it rotates. A rotor with blades in accordance with the present invention generates additional turbulence in the chamber by among other things imparting lateral or traverse movement to the substances as they flow through the mixer. Consequently, such a rotor produces greater turbulence while maintaining energy efficiency.

In accordance with another aspect of the present invention, the mixing chamber may be provided with a rib angled with respect to the axis of rotation of the rotor, rather than being parallel thereto. The rib may be angled in accordance with the present invention so that it extends generally in the same direction as each rotor blade as it becomes substantially aligned with the rib. In the preferred embodiment, the rib is at a greater angle than are the blades of the rotor. Thus, the proximal end of each blade passes the angled rib before its distal end. The interaction of the blades and the rib, including the lateral forces, generates additional shear forces which facilitate mixing.

Other objects and advantages will become apparent from the following detailed description when taken in conjunction with the attached drawings. Moreover, while the invention will be described in connection with a certain preferred embodiment, it is not intended that the invention be limited to the specific embodiment but rather that it be accorded a broad scope commensurate with the claims and consistent with the prior art. For instance, while the invention is described in connection with the mixing of fibrous slurries with chemicals, the invention relates generally to the mixing of any multi-phase, non-newtonian, highly viscous fluid with other substances such as gases, liquids or solids, or a combination thereof.

DETAILED DESCRIPTION OF THE PREFERRED EMBODIMENT

Figure 1:
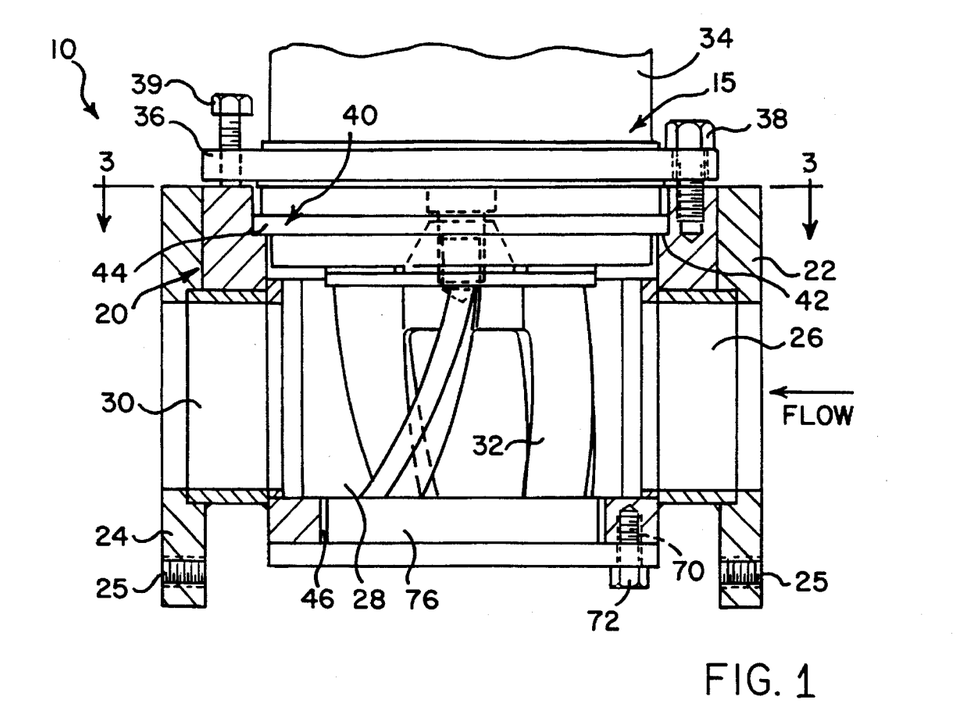
FIG. 1 is a fragmentary top view of the preferred embodiment of the invention, shown in partial cross section.

Referring to FIG. 1, there is shown a preferred embodiment of the present invention in the form of a mixer 10 including a rotor assembly 15 mounted to a casing 20. The mixer 10 may be utilized at any point in a processing system where the mixing of one or more substances is desired on a continuous or discontinuous basis. The mixer 10 is especially useful in mixing multi-phase, non-newtonian, highly viscous fluids with gases, liquids and/or solids. In the preferred embodiment, mixer 10 is utilized to mix chemicals with a fibrous slurry on a continuous basis.

Generally, the mixer 10 is coupled at one end to a feed line (not shown) and at the other to a discharge line (not shown). The mixer casing 20 is made of a sturdy material such as cast iron. The feed line is mounted to the inlet flange 22 and the discharge line is mounted to the outlet flange 24 by conventional means such as bolts which fit within holes 25. In the preferred embodiment, the substances to be mixed with the fibrous slurry are injected into the line upstream of the inlet 26 of the mixer 10 by conventional means.

As shown in FIG. 1, the collection of substances including the fibrous slurry and chemicals flows into the mixer 10 through inlet 26 where it is mixed in the mixing chamber 28 and exits through outlet 30. The mixer operates such that the solution exiting the mixer 10 is substantially homogenous in that the chemicals or substances are substantially evenly dispersed throughout the fibrous suspension. To facilitate such mixing, the rotor assembly 15 includes a rotor 32 and a motor 34. In the preferred embodiment, the motor 34 includes a bearing frame and a frame adaptor of conventional construction and placement. The motor 34 is mounted to the mixer casing 20 by flange 36 and bolts 38. Removal bolts 39 are provided for facilitating the separation of the motor 34 from the mixer casing 20. It is noted that other means of coupling the rotor assembly to the mixer casing 20 such as welding may be used.

The rotor assembly 15 has a surface 40 formed in a stepped configuration which substantially corresponds to a receiving surface 42 of the casing 20. Although it is not shown, a gasket may be provided between surfaces 40 and 42 to form a seal therebetween when the rotor assembly 15 is mounted to the mixer casing 20.

The casing 20 includes an access port 46 on its front panel. An access port cover 76, which may be of any sturdy construction such as steel, is mounted to the mixer casing 20 by bolts 72 which screw into hole 70. The access port cover 76 may be removed at appropriate times to perform maintenance of the mixer 10 such as changing the rotor 32. Where access to the mixing chamber 28 is not required, the port cover 76 may be welded to the casing 20 or the mixer casing 20 may be cast as a single construction without a port 46.

In one embodiment, the port cover 76 is constructed of transparent plexiglass. Consequently, an operator can examine the interior chamber 28 of the mixer 10 during operation. As with the rotor assembly 15, the viewing port cover 76 is provided with a gasket which forms a seal with the surface of the mixer casing 20, thereby preventing leakage of substances out of or air into the mixer 10.

Figure 2:
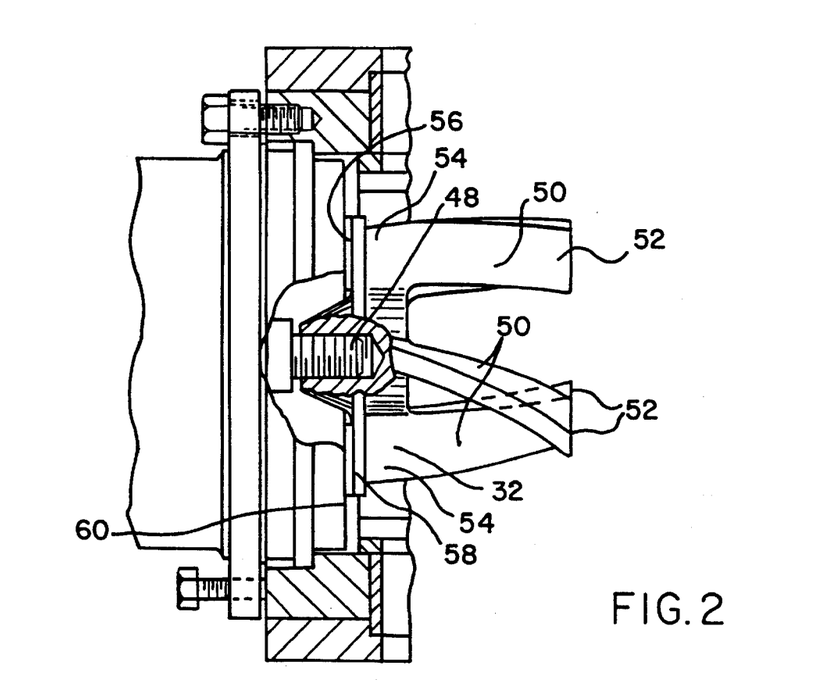
FIG. 2 is a partial top view of the same embodiment of the invention as shown in FIG. 1, except that the motor for the rotor is shown in partial cut away and the casing has been partially removed.

As shown in FIG. 2, the rotor 32 is mounted for rotation on shaft 48 which is driven at predetermined speeds. Any suitable motor 34 may be used to drive the rotor 32. In the preferred embodiment, such a motor may be utilized to drive the rotor 32 of the mixer 10 at 3600 rpm to mix chemicals with a 16% consistency fibrous suspension at a rate of up to and including 2,000 gallons per minute (GPM).

The rotor 32 includes a plurality of blades 50 which extend from the proximal portion 54 of the rotor 32. In the preferred embodiment, the rotor 32 includes three symmetrically spaced rotor blades 50. However, it is contemplated that any number of blades could be provided. Alternative embodiments might have as few as a single blade or as many as desired while still generating the turbulence required to mix the chemicals and fibrous suspension. The blades 50 of the rotor 32 are angled with respect to the axis of rotation of the rotor 32 in a substantially helical pattern. In the preferred embodiment of the present invention, the blades 50 are angled in the direction of rotation of the rotor 32 while maintaining their radial orientation. Thus, the distal ends 52 of the blades 50 lead the remaining portions of the blades as the rotor 32 rotates.

There are numerous blade configurations that are within the scope of the present invention. For example, it is contemplated that the angle of the blades 50 with respect to the axis of rotation could vary substantially. For example, the distal ends 52 of the blades 50 could be angled so that they trail the proximal portions 54 of the blades as the rotor 32 rotates. In another permutation, the blades 50 could be formed substantially parallel to the axis of rotation of the rotor 32. In still other variations, it is contemplated that each of the blades 50 could have a diamond (or other shape) cross section rather than a rectangular cross section as shown. In yet another variation, the blades 50 may be provided with serration which may or may not correspond to serration on a rib 62 which is described in detail below in relation to FIGS. 3–5.

As shown in FIG. 2, rotor 32 includes repeller vanes 56 which protrude from the rear surface of base portion 58 of the rotor 32. The forward surface 40 of the motor 34 includes a substantially flat area 60 directly outside of where the shaft 48 extends. The radially extending repeller vanes 56 rotate in close proximity with the flat area 60 so as to protect a seal between the shaft 48 and the motor 34. The repeller vanes 56 impart circular motion to any substances that might enter the area between the rear surface of the base portion 58 of the rotor 32 and the flat area 60 of the forward surface 40 of the motor 34. The centrifugal forces caused by the circular motion force the substances to move outwardly, thereby generating a low pressure area centrally with respect to the vanes 56. This lower pressure protects the seal between the shaft 48 and the motor 34 by providing a low pressure environment which is isolated from the pressure present in the mixing chamber 28.

In addition to generating a low pressure area to protect the seal between the shaft 48 and the motor 34, the repeller vanes 56 also generate forces which help to counteract the axial force on the rotor assembly 15. In general, there is an imbalance of pressure along the axis of the rotor assembly which leads to axial force being placed on the bearings of the motor causing them to wear prematurely. The low pressure zone generated by the repeller vanes 56 tends to balance and equalize the axial force.

Figure 3:
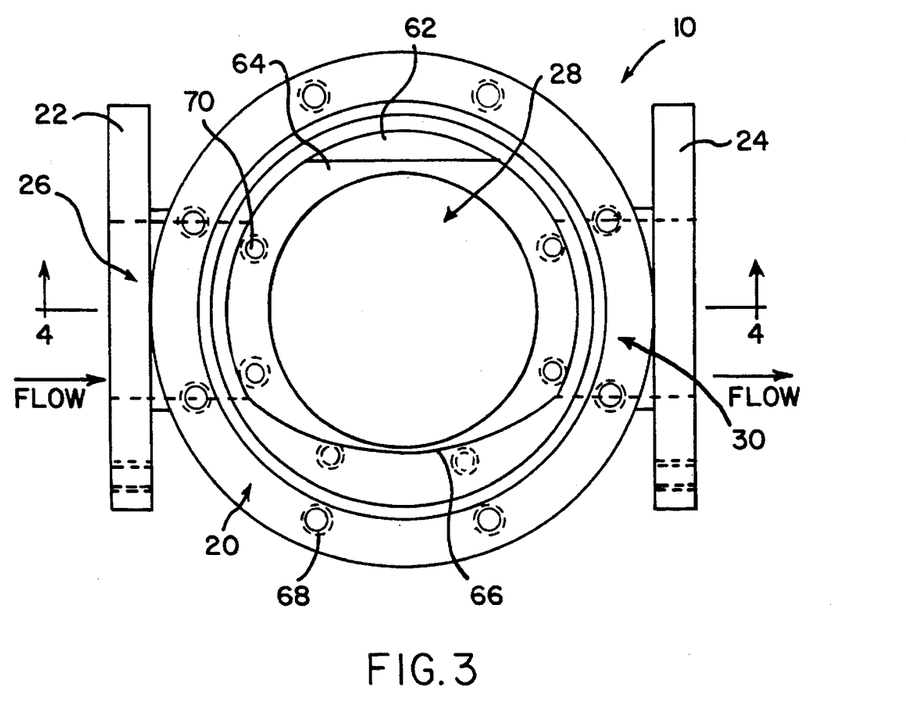
FIG. 3 is an rear elevational view of the inside of the casing chamber after the rotor as shown in FIGS. 1–2 has been removed.
Figure 4:
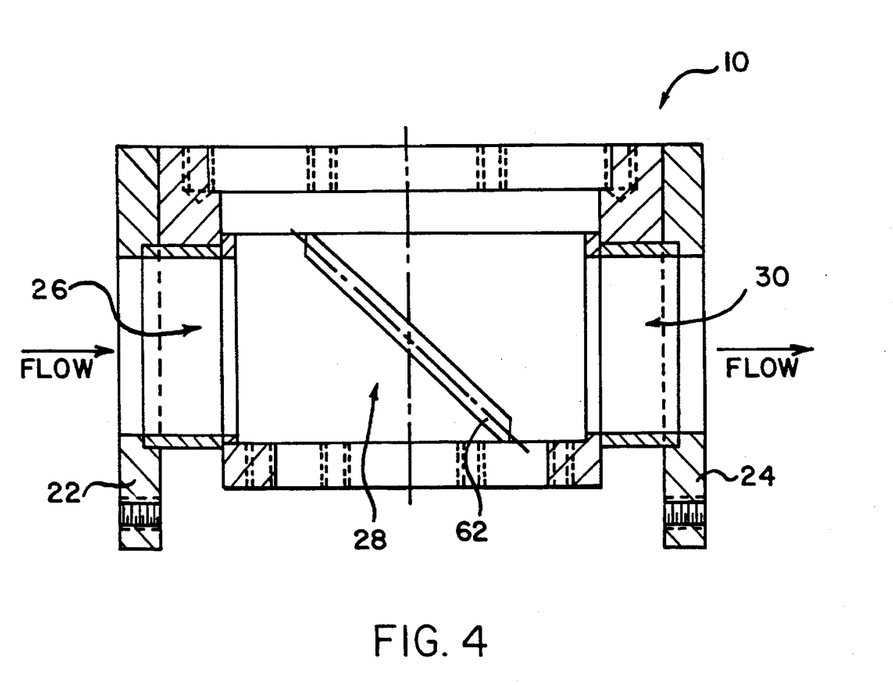
FIG. 4 is a partial bottom view of the casing and mixing chamber depicting the angled rib, shown in cross section.
Figure 5:
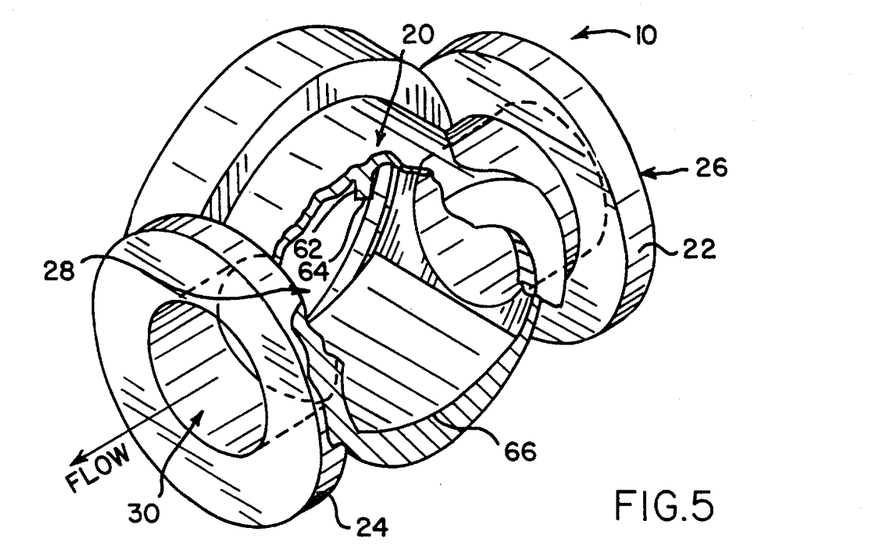
FIG. 5 is an upper left perspective view of the casing and the mixing chamber wherein the chamber is partially cut away.

FIGS. 3–5 show the mixer casing 20 from a variety of views. As explained with respect to FIG. 1, substances under substantial pressure are provided at inlet 26 of the mixer 10, they move into the mixing chamber 28 where they are mixed and leave the mixer 10 through outlet 30. Generally, there is a pump of some form upstream of the mixer which pumps the substances to the inlet 26. The pressure of the substances at the inlet 26 is therefore determined by the upstream pump. Any number of pumps suitable for pumping fibrous suspensions of the consistency to be mixed may be used such as a centrifugal pump, a displacement pump, etc.

Figure 7:
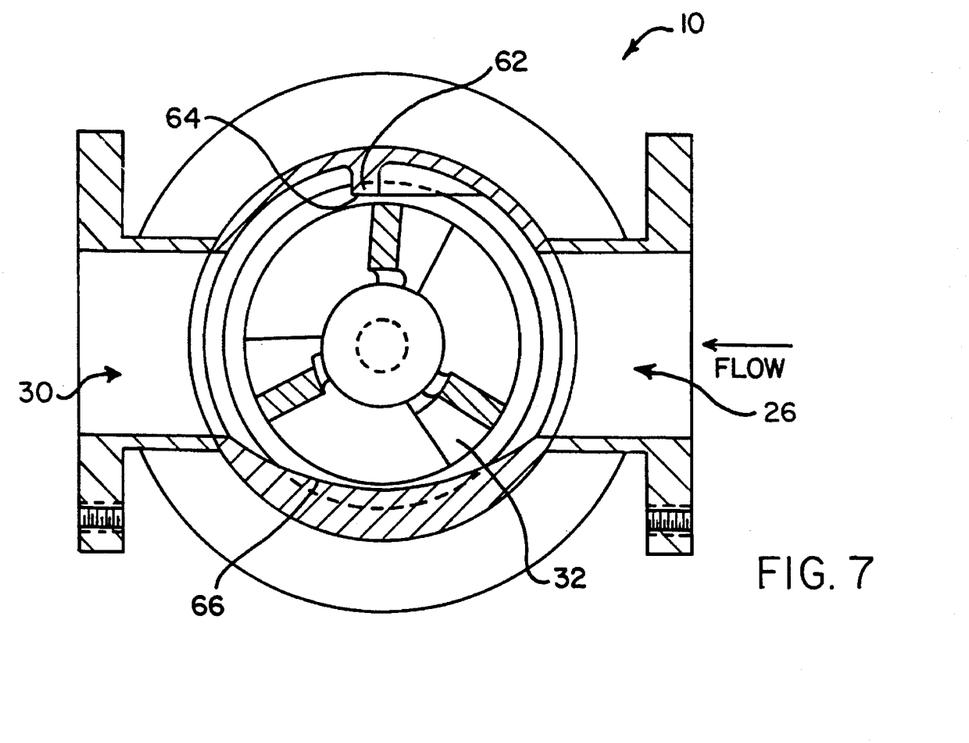
FIG. 7 is a front cross-sectional view of the preferred embodiment.

As shown in FIGS. 3–5, the mixing chamber 28 is provided with a rib 62 which protrudes from the inner surface of the casing 20. In the preferred embodiment, the rib 62 extends diagonally across top portion of the chamber 28 and is shaped so that its inner side 64 is straight rather than curved like the inside surface of casing 20. As a result, the rib 62 looks similar to a half-moon when examined independently of the casing 20. Referring momentarily to FIG. 7, it is shown that the distance between the inner side 64 of rib 62 and the outer contour of rotor 32 varies from one end of the rib 62 to the other. Thus, the shear forces generated between the blades 50 of the rotor 32 and the rib 62 vary as each blade passes, the maximum amount of shear force being present when the clearance between the rib and a particular blade 50 is at a minimum.

Although the inner side 64 of rib 62 is straight and the rib 62 is placed diagonally across the inner surface of casing 20 in the preferred embodiment of the invention, it is within the scope of the invention that the rib 62 could take on any number of shapes and be placed in a number of locations. For example, the inner side 64 of rib 62 could be shaped to maintain a constant or a varying distance from the blades 50 of the rotor 32. In an embodiment where the inner side 64 of rib 62 is maintained at a constant distance from the blades 50, the shear forces generated between the rib 62 and each blade 50 as it passes are relatively constant. However, in such an alternative embodiment, the shear forces do not increase and decrease relatively gradually but begin and end relatively abruptly.

In addition to the various shapes the rib 62 may take on, it is also contemplated that its placement could be altered. In particular, the angle of the rib 62 with respect to the axis of rotation of rotor 32 can be modified. In one such alternative embodiment, the rib 62 could be placed parallel to the axis of rotation of the rotor 32. In such an embodiment, the shear forces generated between an individual blade 50 and the rib 62 would be more like a pulse rather than a gradual increase and decrease. In another specific alternative, the orientation of the rib 62 could be reversed so that it extended diagonally across the inner surface of the casing 20 in the opposite direction.

As further shown in FIGS. 3 and 5, the mixing chamber 28 as defined by the inner surface of the casing 20 (not including the rib 62 or the inlet 26 and outlet 30) is non-circular. The non-circularity of the mixing chamber 28 is due to the lower surface 66 which extends from the inlet 26 to the outlet 30 with a substantially greater radius of curvature than the upper surface. The lower surface 66 is continuous with the inner contour of the mixing chamber 28. Along this portion of the inner surface of the casing 20, no rib is provided to interact with the blades 50 of the rotor 32 to generate shear forces. Consequently, a more stable flow is permitted along the lower surface 66 as the blades 50 re-circulate the substances. The lower surface 66, thus provides for a greater forward circulation overall of the substances toward the outlet 30 of the mixer 10.

Figure 6:
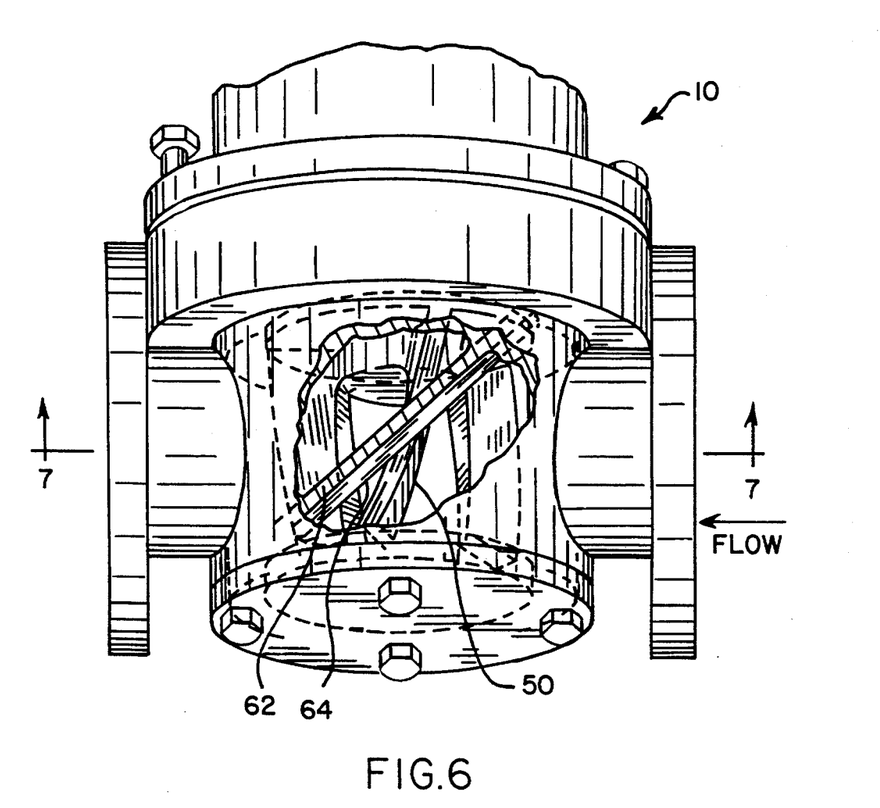
FIG. 6 is a top perspective view of the mixer with a partial cut away to show the mixing chamber and the blades of the rotor.

FIG. 6 shows the interaction between a blade 50 and the rib 62 as the blade 50 moves past the rib 62 during operation of the mixer 10. As shown, the blade 50 is at its closest point to the inner side 64 of the rib 62 and thus the shear forces are the most intense in this position. With regard to the orientation of the rib 62 and the blade 50, it is noted that they are each angled in the same direction; however, the rib 62 is angled slightly more than the blade 50 with respect to the axis of rotation of the rotor 32. Thus, in addition to the shear forces generated because of the circular motion imparted to the substances by the blades 50, the angled nature of the blades 50 imparts a lateral (with respect to the overall flow of the substances into and out of the mixer 10) component of motion which provides additional shear forces. In that the blades 50 of the rotor 32 are curved rather than just angled, the lateral component of shear forces increases as the blade 50 moves further along the rib 62.

It will be noted in regard to FIG. 6 that the blades 50 move in a direction from right to left as they pass the rib 62. Thus, the blades 50 of the rotor 32 urge the substances in the overall direction of flow through the mixer 10 when the substantial turbulence is generated. As shown in FIG. 7, the fibrous suspension and the chemicals enter the mixer 10 through inlet 26. As the substances reach the mixing chamber, the blades 50 of the rotor 32 urge the substances to flow in a counterclockwise direction past the rib 62. As the blades 50 pass the rib 62, substantial turbulence is generated within the substances causing them to become mixed. After the blade 50 passes the rib 62, some of the now mixed substances move into the outlet 30 and out of the mixer 10. A substantial amount of the mixed or partially mixed substances are urged in a counterclockwise direction around the bottom of the mixing chamber 28. As the substances move past the inlet, they pick up more unmixed substances. Then, as before, the substances are moved past the rib 62 where substantial turbulence causes them to mix. Repeating the previous cycle, some of the mixture is delivered to the outlet of the mixer while the remaining amount is recirculated.

Some of the substances to be mixed pass through the center of the mixing chamber 28. Those substances are subjected to substantial shear forces and turbulence as a result of the interaction of the blades 50. In particular, the radially inner surfaces of the blades 50 interact with one another in the center area of the mixing chamber 28 to generate substantial turbulence in substances which are present. This added turbulence and flow increases the efficiency of the mixer 10 by lowering the resistance of the mixer 10 while increasing the degree of mixing.

As is shown in FIG. 7, there is substantially more clearance between the blades 50 of the rotor 32 and the rib 62 than between the lower inner surface 66 of the casing 20 and the blades 50. The area of separation between the blades 50 and the rib 62 was chosen to optimize the generation of shear forces and the resulting turbulence. The close clearance between the blades 50 of the rotor 32 and the lower surface 66 of the casing 20 was chosen to maximize recirculation while presenting little resistance to flow.

Figure 8:
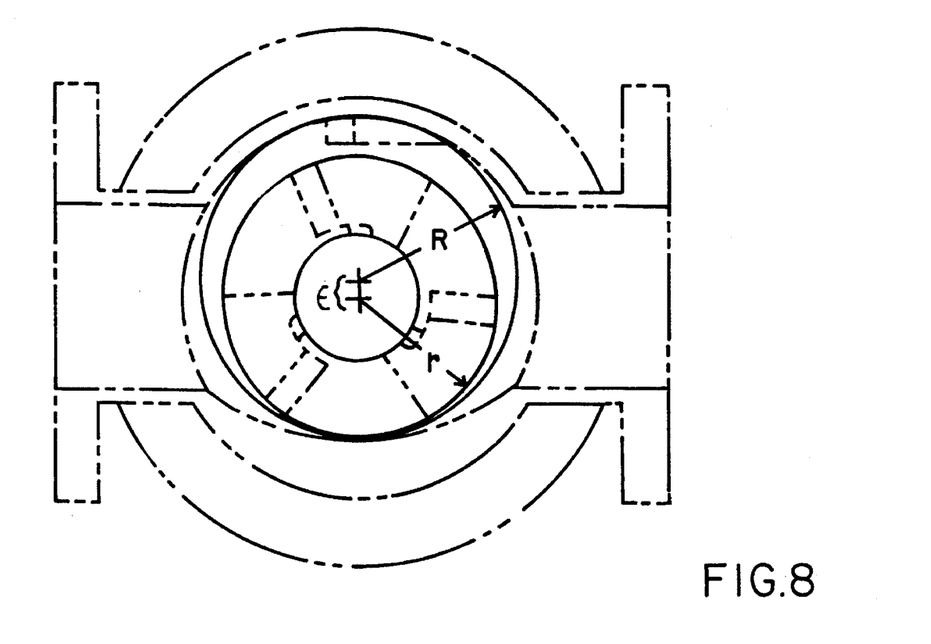
FIG. 8 is a diagrammatic view of the outer circumference of the blades as they rotate during operation and a contour corresponding to the inner surface of the mixing chamber.

FIG. 8 demonstrates the eccentric nature of the mixing chamber 28 relative to the rotor 32 of mixer 10. The circle defined by the radius r defines the outer circumference of the rotor 32 as it rotates. The circle defined by radius R relates to the overall location of the mixing chamber 28. As is readily apparent, the center of the circle relating to the rotor 32 is located in line with the inlet 26 and outlet 30. On the other hand, the center of the circle relating to the contour of the mixing chamber 28 is displaced from the center point of the rotor 32. Essentially, this drawing shows that the overall flow path through the mixing chamber 28 is skewed towards the rib 62. Taken in the context of the rotational dynamics described above, it can be seen that the overall flow characteristics of the mixing chamber 28 favor flow through the mixer 10. Thus, the resistance of the mixer as measured as a pressure drop across the inlet and outlet of the mixer has been substantially diminished.

A direct consequence of the lowered pressure drop across the mixer 10 is that the pressure required at the inlet 26 of the mixer 10 may be less than previously required. Thus, a substantial reduction in energy consumption can be realized in a processing system incorporating the present invention. Therefore, the overall costs are reduced while the efficiencies are improved.

While the invention has been described in relation to a preferred embodiment, it is to be understood that there are numerous other possible structural configurations. For example, while the placement of the inlet 26 and the outlet 30 has been described in connection with the preferred embodiment where the inlet 26 and outlet 30 are in line with each other, other placements of the inlet 26 and outlet 30 are within the scope of the invention. In particular, embodiments are contemplated where the center lines of the inlet 26 and outlet 30 form an angle with each other rather than being in line. In other alternatives, the inlet 26 may be located in the front panel of the casing 20 where the access port 46 is located as in the preferred embodiment.

In another alternative, the inner contour of the mixing chamber would be modified to more closely correspond to the circle with the radius R in FIG. 8. In still other alternatives, the rotor assembly 15 would be mounted off center and the mixing chamber would be concentric with the circle with the radius r.

What is claimed is:

1. A mixer for mixing at least two substances, said mixer comprising:

a mixer casing having an inlet and an outlet, each having an opening and a center axis which extends axially through the center of the opening, said inlet for receiving a stream of unmixed substances under pressure;

a motor, including a rotatable shaft, adapted to be mountable on said mixer casing;

a rotor mounted on said rotatable shaft for rotation about an axis of rotation and including a plurality of elongated blades which extend at least partially in a direction perpendicular to the center axis of said inlet or said outlet; and, a mixing chamber housing said rotor and defined in part by an inner surface of said mixer casing, said inner surface having a contour which is in closer proximity to said blades on one side of said rotor than on a generally opposite side of the rotor, said inner surface and said blades of said rotor thereby defining respective regions of lesser and greater clearance between each other, said mixing chamber further including an elongated rib protruding from the inner surface of said mixer casing in said region of greater clearance and extending at least partially in a direction perpendicular to the center axis of said inlet or said outlet.

2. A mixer according to claim 1, wherein said blades and said elongated rib interact within said region of greater clearance to generate turbulence whereby the stream of unmixed substances is substantially homogeneously mixed before leaving said outlet.

3. A mixer according to claim 1, wherein said mixing chamber includes a center axis which is offset from the axis of rotation of said rotor.

4. A mixer according to claim 1, wherein said motor includes a bearing frame and a frame adaptor, said bearing frame being coupled to said frame adaptor which is mounted on said mixer casing.

5. A mixer according to claim 4, wherein said blades of said rotor are symmetrically positioned with respect to the axis of rotation of said rotor.

6. A mixer according to claim 1, wherein said inlet and said outlet are coaxial.

7. A mixer according to claim 1, wherein said blades of said rotor are spaced from one another radially outside of the axis of rotation of said rotor.

8. A mixer according to claim 1, wherein said blades of said rotor are disposed radially outside of the axis of rotation of said rotor and spaced from each other in an open configuration.

9. A mixer according to claim 1, wherein each individual blade of said rotor interacts with said elongated rib to generate turbulence while each individual blade is moving in the direction of overall flow of said substances from said inlet to said outlet thereby tending to facilitate the overall flow of substances through the mixing chamber.

10. A mixer according to claim 1, wherein the inner surface of said mixer casing defining said region of lesser clearance with said rotor blades is smooth and continuous.

11. A mixer for mixing substances, said mixer comprising:

a mixer casing having an inlet and an outlet, each having an opening and a center axis which extends axially through the center of the opening, said inlet receiving a stream of unmixed substances under pressure;

a mixing chamber defined in part by an inner surface of said mixer casing and in communication with said inlet for receiving said unmixed substances from said inlet, said mixing chamber including a fixed elongated rib protruding from the inner surface of said mixer casing and extending at least partially in a direction perpendicular to the center axis of said inlet or said outlet; and, an open rotor mounted on a shaft and rotatably disposed within the mixing chamber, the shaft arranged substantially perpendicular to the center axes of said inlet and said outlet of said mixer casing and defining an axis of rotation for said rotor, said open rotor including a plurality of spaced blades, each blade extending at least partially in a direction perpendicular to said stream of unmixed substances, each blade also disposed radially outside of and being spaced away from the axis of rotation such that a substantially completely open space is defined near the axis of rotation of said rotor through which said stream of unmixed substances may flow, said blades interacting with said elongated rib to generate turbulence within said mixing chamber whereby said stream of unmixed substances is substantially homogeneously mixed before moving into said outlet of said mixer casing.

12. A mixer according to claim 11, wherein said blades of said rotor are symmetrically positioned with respect to the axis of rotation of said rotor.

13. A mixer according to claim 11, wherein said blades and said elongated rib are angled with respect to the axis of rotation of said rotor.

14. A mixer according to claim 13, wherein said blades are formed in a substantially helical shape.

15. A mixer according to claim 13, wherein the angle of said blades substantially matches the angle of said elongated rib when said blades are substantially aligned with said elongated rib.

16. A mixer according to claim 13, wherein the angle of said elongated rib is greater than the angle of said blades with respect to the axis of rotation of said rotor when said blades are substantially aligned with said elongated rib.

17. A mixer according to claim 13, wherein the angle of said blades has the tendency to impart lateral movement to said substances while imparting substantial turbulence.

18. A mixer according to claim 11, wherein the spaced blades of the rotating rotor define a circular contour, and wherein the elongated rib includes a flat face facing the rotor, whereby the clearance between each individual blade and said elongated rib changes as each individual blade passes said rib.

19. A mixer according to claim 11, wherein said blades of said rotor interact with one another to generate substantial turbulence therebetween.

20. A mixer according to claim 11, wherein said inner surface of said mixer casing defines an inner contour which is in closer proximity to said blades on one side of said rotor than on a generally opposite side of the rotor.

21. A mixer according to claim 11, wherein said inner surface of said mixer casing and said rotor define regions of lesser and greater clearance between each other, said elongated rib protruding from the inner surface of said mixer casing in the region of greater clearance.

22. A mixer according to claim 11, wherein each individual blade of said rotor interacts with said elongated rib to generate substantial turbulence in said substances while each individual blade is moving in the direction of overall flow of said substances from said inlet of said mixer to said outlet.

23. A mixer according to claim 22, wherein each individual blade, in interacting with said rib while moving in the direction of the overall flow of said substances, thereby tends to facilitate the overall flow of said substances through said mixing chamber.

24. A mixer for mixing substances, said mixer comprising:

a mixer casing having an inlet and an outlet, each having an opening and a center axis which extends axially through the center of the opening, said inlet receiving a stream of substantially unmixed substances under pressure;

a mixing chamber defined in part by an inner surface of said mixer casing and for receiving said unmixed substances from said inlet, said mixing chamber including a smooth and continuous region corresponding to said inner surface and a fixed elongated rib protruding from said inner surface which extends at least partially in a direction perpendicular to the central axis of said inlet or said outlet; and, an open rotor mounted on a rotatable shaft and rotatably disposed within the mixing chamber, the shaft arranged substantially perpendicular to the central axes of said inlet and said outlet of said mixer casing and defining an axis of rotation for said rotor, said open rotor including a plurality of spaced blades extending at least partially in a direction perpendicular to said stream of unmixed substances, each individual blade disposed radially outside of and being spaced away from the axis of rotation such that a substantially completely open space is defined near the axis of rotation of said rotor through which said stream of unmixed substances may flow, each individual blade interacting with said smooth and continuous region of said mixing chamber while moving in a direction opposite the overall flow of said substances from said inlet of said mixer casing to said outlet, each individual blade also interacting with said elongated rib while moving in a direction of the overall flow of said substances to generate substantial turbulence in said substances while tending to facilitate the overall flow of substances through the mixing chamber.

25. A mixer according to claim 24, wherein said inner surface of said mixer casing is in closer proximity to said blades on one side of said rotor than the on a generally opposite side of the rotor.

26. A mixer according to claim 25, wherein said inner surface and said blades of said rotor thereby define respective regions of lesser and greater clearance between each other, said elongated rib disposed in the region of greater clearance between said rotor and said inner surface.

27. A mixer according to claim 26, wherein said elongated rib is formed integrally with said mixer casing.

28. A mixer according to claim 24, wherein said inlet and said outlet are coaxial.

\* \* \* \* \*